Patented Mar. 15, 1932

1,849,428

UNITED STATES PATENT OFFICE

JULIUS LAUX, OF UERDINGEN/NIEDERRHEIN, GERMANY, ASSIGNOR TO I. G. FARBEN-
INDUSTRIE AKTIENGESELLSCHAFT, OF FRANKFORT-ON-THE-MAIN, GERMANY, A
CORPORATION OF GERMANY

IRON OXIDE PIGMENTS AND PROCESS OF PRODUCING THE SAME AS BY-PRODUCTS OF
THE REDUCTION OF AROMATIC NITROCOMPOUNDS

No Drawing. Application filed August 12, 1929, Serial No. 385,457, and in Germany May 8, 1925.

The present invention relates to a process of producing iron oxide pigments; more specifically it relates to a process in which a finely divided iron oxide is obtained as a by-product from the reduction of aromatic nitro compounds to the corresponding amines by means of iron and acid or an acid reacting salt. The invention also embraces the resulting new products.

In the methods of producing aromatic amines from aromatic nitro compounds heretofore known and used for a long time involving the use of iron and an amount of acid insufficient to dissolve the same or a salt exerting an acid reaction due to hydrolysis, the iron serving as the reducing agent generally changes into a brownish black oxide whose composition corresponds to a formula lying between $Fe_3O_4$ and $Fe_2O_3$. This oxide is not useful as a color pigment and is of very inferior quality on account of its slight coloring and covering power.

To illustrate the old process it may be stated that in the manufacture of aniline with every 100 parts of nitrobenzene about 100 parts of iron, 8 to 10 parts of concentrated hydrochloric acid (specific gravity 1.16) and about 100 parts of water are employed. The reduction is carried out by adding the nitrobenzene and iron to the hydrochloric acid and water heated to about 100° at such a rate that the temperature of about 100° C. is maintained by the heat of reaction. When reduction is finished, the oily layer of aniline is drawn off and the remaining aqueous liquid distilled by steam after having added some lime, if necessary. The iron oxide represents a waste product of no commercial value. As is further known, the hydrochloric acid employed in the reduction may be substituted by a more or less equivalent quantity of sulfuric acid, acetic acid, sulfurous acid or the like or by a dilute solution i. e. an aqueous solution containing less than 5 percent of a salt exerting an acid reaction due to hydrolysis such as ferrous chloride without changing the properties of the resulting iron oxide sludge.

According to this invention the reduction is carried out under such conditions that the aqueous phase of the reaction mixture is a highly concentrated salt solution, that is, an aqueous solution which contains at least 12 percent of a dissolved salt, preferably 15 to 25 percent and the concentration of which may rise as far as the saturating concentration of the respective salt and does not fall below the lower limit of 12 percent during the reduction process. This is effected by adding enough of an easily soluble salt to the amount, required for reduction, of the dilute acid or dilute solution of a salt exerting an acid reaction due to hydrolysis, so that a solution of the desired high concentration results, or, what in practice amounts to the same thing, by dissolving the acid or acid salt, as the case may be, in a concentrated aqueous solution of a salt instead of in water. In other words, the acid reacting salt, or the mixture of acid and salt, as the case may be, is used in such amount and concentration as to produce a ferroso-ferric oxide sludge substantially free from acidic residues and adapted to form a black commercial iron oxide pigment. The salts which have been found suitable for carrying out my process are of different kinds. The easily soluble chlorides of such metals as are more electropositive than iron, for example, the chlorides of alkali and alkaline earth metals, of magnesium, of zinc and aluminium preferably are used; but easily soluble salts of other acids or other metals and especially the salts of iron itself have been likewise found efficacious. Even the salts of nitric acid, though they require an additional quantity of iron as compared with the salts of non-oxidizing acids, are operative, and the salts of ammonia or amines and those of organic acids do not differ anyhow from others in their effect.

If the salt used for the production of the necessary concentration of the solution itself reacts acid, that is, it undergoes a hydrolysis with liberation of hydrogen ions, the special addition of an acid may be dispensed with.

This hydrolysis largely depends on the composition of the salt and the action of the salt upon the iron i. e. the reducing effect is different in accordance therewith. A certain minimum degree of hydrolysis, therefore, must be present in the aqueous phase of the reaction mixture and I have found that generally 2 to 3 parts of the acid reacting salt upon 100 parts of nitro compound will suffice to produce a sufficient hydrolysis. Examples for salts of this kind are those easily soluble and acid reacting salts of metals more electropositive than iron such as zinc chloride especially the acid reacting salts of iron itself, and the salts of aromatic amines e. g. aniline hydrochloride or aniline acetate.

The characteristic feature of the new process is in every case that the nitro compound to be reduced is treated with iron and a concentrated aqueous solution of a salt, which besides ions of the salt contains also free hydrogen ions, the latter, however, being in such a small amount as is insufficient to dissolve the iron, or in other words the quantity of acid in the reduction mixture does not substantially differ from that used in the old process referred to above. It therefore is distinguished from the old method by the fact that the concentration of the solution of the salt is much higher than hitherto used i. e. it always exceeds 12 percent and preferably solutions of 20 percent or more content in salt are employed. If the reduction is carried out in the presence of such concentrated salt solution which besides the ions of the respective salt contains also free hydrogen ions (the process not essentially departing in other respects from the customary processes—as will be evidenced by the examples set forth—) there remains after the separation of the aromatic amine, for example, aniline resulting from the nitro compound a slurry which contains the oxidized iron in a most finely divided state and, in fact, in most cases as a deep black ferrosoferric oxide $Fe_3O_4$ and in certain cases as a yellow brown hydrate of the iron oxide $Fe_2O_3$. After levigation, washing out and drying this oxide is useful as a color pigment either directly or, if red shades are desired, after being subjected to a preliminary calcination.

The process is illustrated by the following examples (the parts being by weight). It will be understood that it is capable of being carried out by other nitro compounds than those mentioned in these examples, for example with chlor-, hydroxy- and amino-nitro compounds, poly-nitro compounds, and nitrosulfonic acids. Other easily soluble salts such as chromium, titanium, iron salts or salts of rare earth metals can be employed instead of the salts mentioned in the examples, if only they are soluble enough to give the necessary high concentration. Other acids such as acetic acid, sulfonic acids can be used and even nitric acid is operative.

*Examples*

1. 150 parts of a 30% sodium chloride solution is made acid with 15 parts of 1,16 sp. gr. hydrochloric acid, and treated with 250 parts of ground iron. At 100°, 200 parts of nitrobenzene are allowed to run in in such a way that the temperature maintains itself at 100° due to the heat of reaction. When the reduction is finished, the resulting aniline is separated in the well-known manner. There remains behind a highly valuable deep black ferroso-ferric oxide which is purified from the salts and dried. The ferroso-ferric oxide so obtained in contrast to that produced by the reduction methods heretofore known is capable of being easily converted into a red iron oxide pigment by calcination and oxidation.

2. The process is carried out as described in Example 1 except that 150 parts of a 40% calcium chloride solution is used in place of the 150 parts of sodium chloride solution.

3. 180 parts of iron powder are introduced at 100° C. during the course of several hours into a mixture of 150 parts of water, 200 parts of nitrobenzene, 60 parts of calcium chloride, and 6 parts of 1.16 sp. gr. hydrochloric acid. When the reaction is finished, the aniline is obtained in the well-known manner, the slurry remaining behind is washed out, and calcined at 700° C. A very valuable red iron oxide of good coloring power is obtained.

4. 20 parts of hydrochloric acid (specific gravity 1.16) and 250 parts of iron turnings are added to 190 parts of a 30% magnesium chloride solution. This mass is heated and 200 parts of α-nitronaphthalene are introduced into it slowly. When the reduction is finished, the ready α-naphthylamine is separated in the well known manner. The resulting very valuable ferroso-ferric oxide is washed and dried as in the previous examples.

5. 200 parts of o-nitro-toluene in a solution of 20 parts of aluminum chloride and 30 parts of sodium chloride in 200 parts of water are reduced in the usual manner by means of 220 parts of iron and 70 parts of 1.16 sp. gr. hydrochloric acid. After working up, besides o-toluidine a yellow-brown iron oxide is obtained which is transformed into a deep red iron pigment on heating.

6.   485 parts of water
    240 parts of rock salt
    115 parts of sulfuric acid 78%
    300 parts of ground iron are stirred and heated at 100° C. Then 500 parts of ground iron and 600 parts of nitrobenzene are allowed to slowly run into the mixture. After complete reduction the aniline is separated in the known manner and the remaining slurry levigated, washed out and dried. A black iron oxide pigment is obtained having a very high coloring power and being converted into a red violet iron oxide by calcining it.

7. 150 parts of water
60 parts of magnesium sulfate
35 parts of formic acid 80% are heated to 100° C. and 300 parts of ground iron
200 parts of nitrobenzene
100 parts of water added to the mixture in small portions. After separation of the aniline a blue black iron oxide pigment particularly suitable for painting is obtained. By calcining it a lustrous red iron oxide is produced.

8. 75 parts of water, 50 parts of potassium bromide and 17 parts of sulfuric acid 96% are heated as above to 100° C. and slowly mixed with 250 parts of iron, 200 parts of nitrobenzene and 75 parts of water. The working up of the reaction mixture yields a black iron oxide pigment of excellent properties.

9. 150 parts of water
50 parts of sodium acetate
30 parts of hydrochloric acid 20° Bé.
250 parts of iron borings are heated at 100° C. and 200 parts of nitrobenzene and
50 parts of water allowed to slowly run into the mixture. After separation of the aniline a brown black slurry of very fine texture remains which is converted into a bright red iron oxide by calcining it.

10. 75 parts of water
50 parts of ammonium bromide
65 parts of hydrobromic acid 40% are heated to 100° C. and 250 parts of ground iron and
200 parts of nitrobenzene added in small portions. The working up of the reaction mixture yields a deep black iron oxide pigment which can be converted into a lustrous red iron oxide.

11. 150 parts of water
40 parts of ammonium chloride
30 parts of hydrochloric acid 35% are heated at 100° C. and 250 parts of ground iron and
200 parts of α-nitronaphthalene added to the mixture. If the mixture should become too stiff in the course of the reduction, a small quantity of water may be added. After complete reduction the α-naphthylamine is extracted by means of a solvent and the slurry worked up as shown above. A bluish black iron oxide pigment is obtained.

12. 100 parts of aniline water (an aqueous solution containing about 3 percent aniline), 291 parts of a ferrous chloride solution (specific gravity 1.41), 70 parts of a 35% hydrochloric acid and 40 parts of nitrobenzene are heated to about 100° C. Then 560 parts of nitrobenzene and 780 parts of finely ground iron are added at such a rate that the temperature of about 100° C. is maintained due to the heat of reaction. When reduction is finished, a deep black ferroso-ferric oxide is obtained after purifying the slurry remaining behind as shown in the foregoing examples. By calcining it a red iron oxide of bluish shade and of high coloring power is produced.

13. 100 parts of water, 40 parts of sodium nitrate, 24 parts of concentrated sulfuric acid are heated to about 100° C. At this temperature 250 parts of finely ground iron and a mixture of 180 parts of nitrobenzene and 40 parts of water is introduced at such a rate that the temperature of about 100° C. is maintained due to the heat of reaction. The working up as shown in the foregoing examples yields a bluish black iron oxide pigment which is converted to a red iron oxide of violet shade by calcining it.

14. 250 parts of ground cast iron turnings are added to 120 parts of a 20% ferrous chloride solution and 200 parts of o-nitrotoluene are allowed to slowly run in at boiling temperature. When reduction is finished, the o-toluidine is obtained in the known manner. The iron slurry remaining behind is freed from unattacked iron and soluble salts by means of levigation and washing out and then dried. It represents a ferroso-ferric oxide of deep black color and high coloring and covering power.

15. 100 parts of water
21 parts of anhydrous ferric chloride
250 parts of iron borings are heated at 100° C. and 200 parts of o-nitrotoluene and
50 parts of water allowed to slowly run into the mixture. After complete reduction the o-toluidine is separated and the remaining slurry yields after levigating, washing out and drying a deep black color pigment having a high coloring power and being converted into a lustrous red iron oxide by calcining it.

16. 150 parts of water
50 parts of zinc chloride
250 parts of iron borings are heated to 100° C. and 200 parts of nitrobenzene allowed to slowly run into the mixture. After separation of the aniline a black iron oxide pigment having a high color strength and a fine color shade is obtained.

17. 150 parts of water
100 parts of chrome alum
200 parts of nitrobenzene are heated at 100° C. and 250 parts of iron borings and
50 parts of water added in small portions. In addition to aniline a yellow slurry results which can be converted into a brown red iron oxide pigment by calcining it.

18. 200 parts of nitrobenzene are allowed to run into a 200 parts of a 30% magnesium chloride solution heated to about 100° C. and containing about 200 parts of ground iron borings in such a way that the temperature maintains itself at about 100° C. due to the reaction heat. When reduction is finished, the resulting aniline is separated in the known manner. The iron slurry remaining behind is purified as described in example 1 and thus yields a bluish black ferroso-ferric oxide of high coloring and covering power.

19. 200 parts of nitrobenzene are allowed to run at 100° C. into a solution of 70 parts of aniline hydrochloride in 150 parts of water containing about 180 parts of iron powder, in such a way that the temperature maintains itself at 100° C. due to the reaction heat. When reduction is finished, the resulting aniline is separated in the known manner. There remains behind a highly valuable deep black ferroso-ferric oxide which is freed from unattacked iron and from soluble salts and then dried.

20. 200 parts of nitrobenzene and 60 parts of water are allowed to run into a mixture of 100 parts of water, 31 parts of aniline, 20 parts of glacial acetic acid and 250 parts of finely ground iron at about 100° C. The working up as shown in the foregoing examples yields a black iron oxide pigment of greyish shade which is converted to a brilliant yellowish red iron oxide by calcining it.

This is a continuation in part of my copending application Serial No. 106,929 filed May 5, 1926.

I claim:

1. The process which comprises reducing an aromatic nitro compound with metallic iron and an acid-reacting concentrated aqueous solution of a salt insufficient in amount to dissolve the iron and in amount and concentration sufficient to produce a ferroso-ferric oxide sludge substantially free from acidic residues and adapted to form a black commercial iron oxide pigment, separating the resulting ferroso-ferric oxide sludge from the resulting aromatic amino compound, and purifying the former by washing.

2. The process which comprises reducing an aromatic nitro compound with metallic iron and an acid-reacting concentrated aqueous solution of a salt insufficient in amount to dissolve the iron and in amount and concentration sufficient to produce a ferroso-ferric oxide sludge substantially free from acidic residues and adapted to form a commercial ferroso-ferric oxide pigment, separating the resulting ferroso-ferric oxide sludge from the resulting aromatic amino compound, purifying the former by levigation and washing, and drying and calcining the resulting product.

3. The process which comprises reducing an aromatic nitro compound with metallic iron and an amount of acid insufficient to dissolve the iron, in the presence of a concentrated aqueous solution of a salt, the acid and salt being in amount and concentration sufficient to produce a ferroso-ferric oxide sludge substantially free from acidic residues and adapted to form a commercial iron oxide pigment, separating the resulting ferroso-ferric oxide sludge from the resulting aromatic amino compound, and purifying the former by washing.

4. The process which comprises reducing an aromatic nitro compound with metallic iron and an amount of acid insufficient to dissolve the iron and under conditions of producing a ferroso-ferric oxide substantially free from acidic residues, in the presence of an aqueous solution containing at least 12 percent of a dissolved salt, separating the resulting ferroso-ferric oxide sludge from the resulting aromatic amino compound, and purifying the former by washing.

5. The process which comprises reducing an aromatic nitro compound with metallic iron and an amount of inorganic acid insufficient to dissolve the iron and under conditions of producing a ferroso-ferric oxide substantially free from acidic residues, in the presence of an aqueous solution containing at least 12 percent of a salt of a metal, separating the resulting ferroso-ferric oxide sludge from the resulting aromatic amino compound, and purifying the former by washing.

6. The process which comprises reducing an aromatic nitro compound with metallic iron and an amount of inorganic acid insufficient to dissolve the iron, in the presence of an aqueous solution containing at least 12 percent of a chloride of a metal more electropositive than iron, separating the resulting iron oxide sludge from the resulting aromatic amino compound, and purifying the former by washing.

7. The process which comprises reducing an aromatic nitro compound with metallic iron and an amount of hydrochloric acid insufficient to dissolve the iron, in the presence of an aqueous solution containing at least 12 percent of a dissolved chloride of a metal more electropositive than iron, separating the resulting iron oxide sludge from the resulting aromatic amino compound, and purifying the former by washing.

8. The process which comprises reducing an aromatic nitro compound with metallic iron and an amount of hydrochloric acid insufficient to dissolve the iron, in the presence of a 30% solution of sodium chloride, separating the resulting iron oxide sludge from the resulting aromatic amino compound, and purifying the former by washing.

9. The process which comprises reducing an aromatic nitro compound with metallic iron and a concentrated aqueous solution of a salt being capable of exerting an acid reaction in an aqueous solution under conditions of producing a ferroso-ferric oxide substantially free from acidic residues, the said salt being in amount and concentration sufficient to produce an iron oxide sludge adapted to form a commercial iron oxide pigment, separating the resulting ferroso-ferric oxide sludge from the resulting aromatic amino compound, and purifying the former by washing.

10. The process which comprises reducing an aromatic nitro compound with metallic iron and an aqueous solution containing at least 12 per cent of an inorganic salt being capable of exerting an acid reaction in an aqueous solution under conditions of producing a ferroso-ferric oxide substantially free from acidic residues, separating the resulting iron oxide sludge from the resulting aromatic amino compound and purifying the ferroso-ferric oxide sludge by washing.

11. The process which comprises reducing an aromatic nitro compound with metallic iron and an aqueous solution containing at least 12 percent of a metal chloride being capable of exerting an acid reaction in an aqueous solution under conditions of producing a ferroso-ferric oxide substantially free from acidic residues, separating the resulting ferroso-ferric oxide sludge from the resulting aromatic amino compound, and purifying the former by washing.

12. The process which comprises reducing an aromatic nitro compound with metallic iron and an aqueous solution containing at least 12 percent of an iron chloride under conditions of producing a ferroso-ferric oxide substantialy free from acidic residues, separating the resulting ferroso-ferric oxide sludge from the resulting aromatic amino compound, and purifying the former by washing.

In testimony whereof, I affix my signature
JULIUS LAUX.